United States Patent Office 3,564,818
Patented Feb. 23, 1971

3,564,818
PROCESS FOR REMOVAL OF SO₂ FROM FLUIDS
Jack S. Lasky, 29 Newman Ave., Verona, N.J. 07462, and Ronald W. Fuest, 6 Lakeview Drive, Kinnelon Borough, N.J. 07405
No Drawing. Filed Dec. 11, 1968, Ser. No. 783,137
Int. Cl. B01d 53/02
U.S. Cl. 55—73                                    10 Claims

ABSTRACT OF THE DISCLOSURE

The present invention relates to a process for removing $SO_2$ from a fluid such as water, waste gases, etc., which removal is achieved by passing said fluid through a shaped article formed from a polyolefin, polyester or nylon in admixture with a nitrogen-containing polymer.

---

The invention described herein was made in the course of work under a grant or award from the Department of Health, Education, and Welfare.

BACKGROUND OF THE INVENTION (1) Field of the invention

The present invention relates to a process for removing $SO_2$ from a fluid such as water, waste gases, etc., which removal is achieved by passing said fluid through a shaped article formed from a polyolefin, polyester or nylon in admixture with a nitrogen-containing polymer.

(2) Prior art

Present day air pollution control methods using synthetic high polymeric materials result in advantages not heretofor obtained, and yet there are inherent difficulties associated with the use of such materials. For example certain high polymeric materials which have high chemical stability and softening temperatures are being used in liquid and air filter media and bag collectors. When the aforesaid material comprising the filter or bag saturated with pollutant, the non-regenerable material must be destroyed or discarded. In many cases incineration of the material results in undesirable pollutants from the combustion gases entering the atmosphere. Thus when poly-vinylchloride) is burned harmful chlorine gases including hydrogen chloride are produced.

Thus a desirable air pollution control material is one which is chemically stable to acidic reagents, has a relatively high melting temperature, can remove the pollutants from the air, and can be regenerated for continual successive uses.

SUMMARY OF THE INVENTION

The invention relates to polymeric amine-containing materials which are cospun with melt-spinnable fiber-forming resins for use in removing sulfur dioxide from waste gases such as those produced, for example, by the combustion of fossil fuels or by the smelting of ores. The fibers so produced are capable of (1) being regenerated either by thermal or chemical means to restore the sorptive capacity of the fiber for re-use and to (2) recover the sulfur dioxide as a valuable by-product.

We have discovered that when between about 5% and 35% of selected basic-nitrogen containing polymers are added to such thermoplastic resins as polyolefins, polyesters or polyamides the resulting articles made therefrom are capable of sorbing $SO_2$. The articles are capable of sorbing $SO_2$ selectively from waste gases such as those produced by coal combustion or smelting of ores containing relatively low $SO_2$ concentration (e.g. 3000–10,000 p.p.m.), refinery affluents, etc. Furthermore, the $SO_2$ can be desorbed from the articles by raising the temperature above the temperature for sorption, and flushing the sample with an inert gas (e.g. $N_2$). Alternatively, the $SO_2$ can be removed by treating the article chemically with, for example, an aqueous base solution to extract the $SO_2$ into the aqueous phase to form a sulfite or a bisulfite solution.

DESCRIPTION OF PREFERRED EMBODIMENTS

The matrix polymers (i.e. the material of which the article is largely composed) of the polymeric blend compositions to which our invention is applicable comprise three major groupings. One of these groupings is the hydrocarbon polymers, principally the polyolefins, i.e. poly-(1-alkenes) but also copolymers of non-terminal olefins with 1-alkenes and copolymers of two or more 1-alkenes, as well as block and graft copolymers of olefins with each other and with other hydrocarbons. This class would include polyethylene, polypropylene, poly(3-methylbutene-1),poly(4-methyl-1-pentene), random as well as block copolymers of ethylene and propylene, copolymers of propylene and 3-methylbutene-1, copolymers of propylene and 4-methyl-1-pentene and copolymers of any of these monomers with each other and/or with other copolymerizable monomers. The preferred material is polypropylene, by which we mean any polymer of propylene and any copolymer containing predominately polymerized propylene together with any other comonomer copolymerized therewith.

Another major grouping of matrix polymers is the polyesters. These are condensation polymers of dihydric alcohols with organodibasic acids or the anhydrides thereof, particularly dicarboxylic acids, and self-condensation polymers of omega-hydroxycarboxylic acids. It will be understood that the invention is applicable to all film and fiber-forming polyesters, in which the ester linkages are intralinear, including poly(alkylene alkanedioates), poly(cycloalkylenedimethylene alkanedioates), poly(alkylene arenedioates), poly(cycloalkylenedimethylene arenedioates), and analogous materials. Examples of the above-named polyesters are respectively, poly(ethyleneadipate), poly(1,4-cyclohexylenedimethylene adipate), poly(ethylene terephthalate), and poly(1,4-cyclohexylenedimethylene terephthalate). The preferred materials in our invention are poly(ethylene terephthalate), poly(ethylene terephthalate-isophthalate), and poly(1,4-cyclohexylene-dimethylene terephthalate).

The third applicable matrix group is the thermoplastic polyamides, including condensation polymers of a bifunctional amine with a bifunctional carboxylic acid or the anhydride thereof such a poly(hexamethylene adipamide), poly(hexamethylene sebacamide) as well as linear polyamides formed from cyclic compounds, such as polypyrrolidinone, polycaprolactam, polyenantholactam, and copolyamides such as Zytel 61, an interpolymer of hexamethylene adipamide and hexamethylene sebacamide with caprolactam.

The polymers which may be used as the additive basic-nitrogen containing constituent of the blend:
(1) Contain about 1–30% basic nitrogen;
(2) Preferably possess the basic nitrogen in the form of tertiary amino groups, since these groups are more resistant toward oxidation as well as irreversible side reactions with $SO_2$ and other waste gas constituents; (note that generally aliphatic amines are preferred over aromatic amines such as aniline or pyridine derivatives). Since the basicity of the aliphatic amines is generally higher, resulting in more favorable sorption behavior, (i.e., a more stable $SO_2$-amine complex is formed which allows increased sorption at lower $SO_2$ concentrations, as well as allowing sorption to be carried out at higher temperatures);

(3) Must be cospinnable with fiber-forming resins, (i.e. it must be)

(a) capable of melting to form a liquid at or below spinning temperatures, and (b) thermally stable enough to withstand the melt-spinning temperature);

(4) Possess a sufficiently low vapor pressure so that it will not be carried away by the stream of warm gases during use.

The selected basic nitrogen containing polymers which may be used in the present invention are:

(a) Polymers with pendant amino groups as represented by the formula:

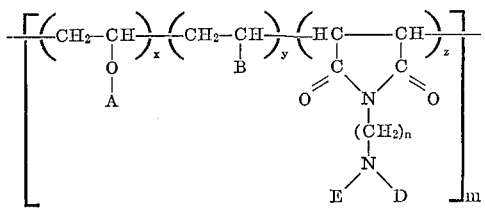

wherein:

A is an alkyl ($C_1$ to $C_{16}$) group

B is an aryl group selected from phenyl, tolyl, xylyl, naphthyl

D and E each are lower-alkyl groups ($C_1$ to $C_5$) or compositely represent an alicyclic ring of 5 carbon atoms $x$ is from 0 to 1

$y$ is 0 to about 0.9

(in all instances $x+y=z$)

$n=2-6$ $m=8-3,000$

The preparation of this material is described in copending United States patent application Serial No. 770,836.

(b) Thermoplastic homopolymers of vinyl-substituted monocyclic and polycyclic pyridine compounds, including quinolines, and thermoplastic copolymers, including graft copolymers, of such compounds with each other and/or with other unsaturated polymerizable compounds. Among the vinylpyridine compounds useful for this purpose in this invention are 2-vinylpyridine, 3-vinylpyridine, 4-vinylpyridine, 3-methyl-6-vinylpyridine, 2-ethyl-5-vinylpyridine, 2-methyl-5-vinylpyridine, 2-ethyl-6-vinylpyridine, 2-isopropenylpyridine, etc. Polymerizable unsaturated monomers with which the vinylpyridine compounds may be copolymerized include other vinylpyridine compounds, acrylic and methacrylic esters typified by ethyl acrylate and methyl methacrylate, vinylaryl hydrocarbons typified by styrene and vinyltoluenes, and olefins and diolefins such as butadiene-1,3. Alternatively, the vinylpyridine compound may be graft-copolymerized by well-known methods with a previously formed linear high polymer, typified by polyethylene, polypropylene, polystyrene, and polybutadiene, or with any of the polyesters described above. It is always desirable that the basic nitrogen-containing polymer contain no more than a minor proportion of non-nitrogen containing material copolymerized with the vinylpyridine compound, since only the basic nitrogen (e.g. pyridine) portion of the polymer additive is active as a $SO_2$ sorbent in the matrix polymer. Preferred materials of this class for use in this invention are polymers of at least one vinylpyridine compound, by which is meant homopolymers of vinylpyridine compounds such as poly(2-vinylpyridine), poly(4-vinylpyridine), poly(2-methyl-5-vinylpyridine), poly(2-isopropenylpyridine), etc., copolymers of various vinyl-substituted pyridine compounds with each other, such as copolymers of 2-vinylpyridine and 2-methyl-5-vinylpyridine in any desired proportions, copolymers of 2-vinylpyridine and 2-isopropenylpyridine in any desired proportions, copolymers of 4-vinylpyridine with 2-vinylquinoline in any desired proportions as well as copolymers of three, four, or more of these polymerizable materials. Also included in the meaning of the term are copolymers of one or more vinylpyridine compounds with other materials copolymerizable therewith, such as styrene.

(c) Polymeric amine compounds, including condensation polymers in which the amine group is an integral part of the polymer chain as well as the addition homopolymers and copolymers wherein pendant groups include or consist of amine groups such as described in (a) above. Examples of polymeric amine compounds of the first type useful in this invention are the condensation products of epihalohydrins or dihaloparaffins with one or more amine or diamine compound, such as the products disclosed in Belgian Patent No. 606,306 as for instance the condensation product of dodecylamine, piperazine and epichlorohydrin. As examples of addition polymers with pendant groups consisting of or containing amines there are the reaction product of a styrene-maleic anhydride copolymer with 3-(dimethylamino)-propylamine (the reaction product being a polyamino-polyimide), and styrene-allylamine copolymers such as those disclosed in U.S. Pat. No. 2,456,428.

Other basic nitrogen polymers which may be used in our invention are polyurethanes, polyureas, polyamides which contain tertiary amino groups in the polymer chain. The preparation of the aforesaid polymers is readily accomplished using monomers having one or more tertiary amino groups. Alkylated polyethyleneimines are also useful in the present invention. Furthermore, mixtures of any of the types of basic nitrogen polymers described above may be used in this invention, provided only that they are mutually compatible.

The amount of said additive basic nitrogen containing polymers described herein to be added to the polyolein, polyester or polyamide matrix is between about 5% and 35%. It is generally preferred to use more than 10% additive polymer in the blend. If the blend is to be extruded into fibers for final use, it is desirable to use as much additive polymer as possible, consistent with good fiber properties.

It is not within the scope of the present invention to use identical polyamides as both the matrix and additive polymer. Whenever a polyamide is used as the matrix polymer, the additive polymer should contain a greater percentage of basic nitrogen per unit of weight than does the amide matrix polymer in order to achieve an improvement in removing the $SO_2$ pollutants from the fluid.

The method used to form the blend is not critical provided the additive polymers of the present invention are homogeneously dispersed throughout the polyolefin, polyester, or polyamide. Incomplete mixing results in the formation of aggregates which impair the physical properties of the blend. The blend may be formed by mixing the two polymers in granular or powder form in a mixing apparatus followed by extrusion.

In general, when forming the mixture by extrusion, the two polymers, in granular or powder form, are first mixed by tumbling. A fine powder is preferred as this increases the degree of homogeneity. The mixture of polymers is fed to the hopper of an extruder and passed through the die at a temperature ranging between 450 and 550° F. depending upon the particular polymers involved. In order to insure complete dispersion, it is desirable to pelletize the extruded strand in a strand chopper and re-extrude to form the desired product under the same extrusion conditions.

These compositions of basic-nitrogen polymers and thermoplastic matrix resins can be used in any convenient form. For example, the blends can be fabricated into films, sheets, pellets, fibers, etc. to carry out $SO_2$ sorption if any such physical form would be more advantageous than the other for a particular process to which this method of $SO_2$ removal is applied.

The fibers produced from such blends may be used in the form of felts, knitted or woven mats, or similar assembly. Particulate filtration may also be accomplished at the same time by means of a process, e.g. a moving belt of the $SO_2$-sorbent fiber passes through a zone where the waste gases pass through the belt. It is in this zone that sorption of the $SO_2$ and collection of the particulate matter on the belt occur at the same time. When the belt passes out of this zone, it passes into another zone where desorption of the $SO_2$ and removal and collection of the particulate matter by mechanical means can be accomplished.

Bicomponent fibers are also applicable in our invention wherein one component of the two would be very highly loaded with sorbent, to the point where by itself could no longer be spun into fiber, and combined with a non-loaded or lightly loaded second component to act as a strength member resulting in an advantage in the sorption characteristics.

The process of the present invention is readily performed by exposing the articles, preferably fibers, having the composition as disclosed herein, to the fluid medium containing $SO_2$. Presumably the basic nitrogen atoms in the additive polymer selectively extract $SO_2$ from the medium by sorption. There are essentially no critical limitations with respect to the practice of this process. Naturally the temperature at which the process is run must be consistent with the melting points of the polymers comprising the article.

EXAMPLE 1

Forty grams of a 1:1 molar ratio of styrene-dimethylaminopropylmaleimide copolymer (prepared as in U.S. Patent 2,456,428) was mixed with 400 grams of polypropylene (Profax 6623—produced by Hercules and containing heat stabilizers) and extruded in rod form to thoroughly mix the copolymer in the polypropylene resin. The extruded rod was sliced into pellets, and extruded into an 8 filament yarn using a conventional melt-spinning apparatus.

EXAMPLE 2

A 4.06 g. sample of the yarn described in Example 1 was dampened, then placed in a 14 cm. x 10 mm. cylindrical chamber in a temperature-controlled box held at 35° C. A simulated waste gas (10,000 p.p.m. $SO_2$, 32,000 p.p.m. $H_2O$ vapor, balance $N_2$) was passed through this sample at a flow rate of 21.2 ml./minute until the $SO_2$ concentration in the effluent gas (determined by gas chromatography) was the same as in the feed gas at which point the maximum $SO_2$ loading was attained—no further sorption of $SO_2$ occurred. The amount of $SO_2$ sorbed by the fiber was .014 g./g. Regeneration was accomplished by raising the temperature of the sample chamber to 95° C., and flushing the sample with dry nitrogen at a flow rate of 21.2 ml./minute. Essentially all of the $SO_2$ was recovered. The sorption cycle was then repeated with substantially the same results as in the first cycle.

EXAMPLE 3

A polypropylene fiber containing 11.1% polyethyleneimine was prepared by mixing 40 gm. of polyethyleneimine (Montrek 1000 produced by Dow Chemical Co.) and 320 gm. of polypropylene powder (Hercules Profax 6501) and 1.12 gm. of heat stabilizer and extruding the mix into a ⅛″ rod to thoroughly mix the polymers. The rod was then chopped into pellets, and the pellets were extruded into an 8 filament fiber.

EXAMPLE 4

The fiber prepared according to Example 3 was then treated with a simulated waste gas stream under the same conditions as used in Example 1. The fiber sorbed 0.0252 g. $SO_2$ per gram of fiber.

EXAMPLE 5

A pressed film containing polypropylene and dry styrene-dimethylaminopropylmaleimide copolymer (screened to 60–100 mesh particle size) in the amounts disclosed in Example 1 was treated with a dry simulated waste gas with the following composition:

|  | Percent |
|---|---|
| $SO_2$ | 0.34 |
| $CO_2$ | 15.2 |
| $O_2$ | 2.94 |
| $N_2$ | 81.52 |

Fourteen cycles of sorption and regeneration were carried out. The capacity of the sorbent in the film at the beginning of the cycle was 0.117 g. $SO_2$/gm. sorbent in the film and on the fourteenth cycle a capacity of 0.114 g. $SO_2$/g. sorbent in the film was obtained—a loss of only 2.6% in capacity.

EXAMPLE 6

Using the procedures employed in Examples 1 and 2 herein, 50 grams of a polyurea prepared by the reaction of 2,4-tolylenediisocyanate with N - methyl - bis(aminopropyl) amine in admixture with 500 grams of polyethylene terephthalate was treated with a dry nitrogen stream containing 10,000 p.p.m. $SO_2$ at 35° C. A loading of 0.074 g. $SO_2$ per gram of aminopolyurea was obtained.

EXAMPLE 7

Using the procedures described in Examples 1 and 2 herein, 500 grams of nylon 6 were blended with 85 grams of a terpolymer of styrene, methylvinylether, and dimethylaminopropylmaleimide (prepared using the method disclosed in copending United States application Ser. No. 770,836) in the mole ratio of 1:1:2 was treated with a dry nitrogen stream containing 10,000 p.p.m. $SO_2$ at 95° C. A loading of 0.138 $SO_2$/gm. terpolymer was obtained.

Having thus described our invention, what we claim and desire to protect by Letters Patent is:

1. A process for the removal of $SO_2$ from a fluid medium comprising, contacting said fluid medium to be treated with a shaped article prepared from a matrix polymer selected from a polyolefin, polyester or polyamide in admixture with between about 5% and 35% of a basic nitrogen containing polymer selected from the group consisting of:
   (a) thermoplastic homopolymers of vinyl-substituted monocyclic and polycyclic pyridine compounds;
   (b) condensation polymers containing tertiary amino groups as an integral part of the polymer chain;
   (c) addition homopolymers or copolymers having pendant amino groups therefrom.

2. The process of claim 1 in which the $SO_2$ saturated article is regenerated using heat.

3. The process of claim 1 in which the $SO_2$ saturated article is regenerated using a basic solution.

4. The process defined in claim 1 in which the matrix polymer is selected from polyethylene, polypropylene, and poly(2-methyl-pentene).

5. The process defined in claim 1 in which the matrix polymer is selected from polyethylene terephthalate, polyethylene-isophthalate, and polyethylene-(isophthalate-terephthalate).

6. The process defined in claim 1 in which the matrix polymer is selected from poly(hexamethylene adipamide), poly(hexamethylene sebacamide), poly(caprolactam), and copolymer of hexamethylene adipamide, and hexamethylene sebacamide with caprolactam.

7. The process defined in claim 4 in which the nitrogen containing polymer is selected from the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis(aminopropyl) amine.

8. The process defined in claim 5 in which the nitrogen containing polymer is selected from the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis(aminopropyl) amine.

9. The process defined in claim 6 in which the nitrogen containing polymer is selected from the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis(aminopropyl)amine.

10. The process defined in claim 7 in which the matrix polymer is polypropylene and the basic nitrogen containing polymer is from about 8% to 25% of the (styrene-dimethylaminopropylmaleimide) copolymer.

References Cited
UNITED STATES PATENTS

| | | | |
|---|---|---|---|
| 3,383,838 | 5/1968 | Carson | 55—73 |
| 3,503,186 | 3/1970 | Ward | 55—73X |
| 3,508,382 | 4/1970 | Schoofs | 55—73 |

JOHN ADEE, Primary Examiner

U.S. Cl. X.R.

53—74; 23—176